(12) United States Patent
Xu

(10) Patent No.: US 9,256,088 B2
(45) Date of Patent: Feb. 9, 2016

(54) THREE-LEVEL-DRIVEN ARRAY SUBSTRATE ROW DRIVING CIRCUIT

(71) Applicant: Shenzhen China Star Optoelectronics Technology Co., Ltd., Shenzhen, Guangdong (CN)

(72) Inventor: Xiangyang Xu, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 56 days.

(21) Appl. No.: 14/347,608

(22) PCT Filed: Jan. 9, 2014

(86) PCT No.: PCT/CN2014/070420
§ 371 (c)(1),
(2) Date: Mar. 26, 2014

(87) PCT Pub. No.: WO2015/100782
PCT Pub. Date: Jul. 9, 2015

(65) Prior Publication Data
US 2015/0185522 A1  Jul. 2, 2015

(51) Int. Cl.
*H03K 3/00* (2006.01)
*G02F 1/133* (2006.01)
*G09G 3/36* (2006.01)

(52) U.S. Cl.
CPC .......... *G02F 1/13306* (2013.01); *G09G 3/3677* (2013.01); *G09G 2310/0286* (2013.01); *G09G 2310/067* (2013.01); *G09G 2320/0219* (2013.01)

(58) Field of Classification Search
CPC .................................................. G02F 1/13306
See application file for complete search history.

(56) References Cited

U.S. PATENT DOCUMENTS 6,970,530 B1   11/2005 Wang et al.
2011/0002437 A1*  1/2011 Su et al. ........................ 377/64

FOREIGN PATENT DOCUMENTS

| CN | 1731501 A | 2/2006 |
| CN | 101079243 A | 11/2007 |
| CN | 101546607 A | 9/2009 |
| CN | 102831860 A | 12/2012 |
| CN | 202771779 U | 3/2013 |
| EP | 0696803 B1 | 5/2001 |
| WO | WO9725716 A1 | 7/1997 |

* cited by examiner

*Primary Examiner* — Daniel Puentes
(74) *Attorney, Agent, or Firm* — Andre C. Cheng

(57) ABSTRACT

A three-level-driven array substrate row driving circuit includes cascaded multi-level array substrate row driving units. The n-th level array substrate row driving unit includes a clock signal input, a (n−1)-th level signal input, a (n+1)-th level signal input, a (n+3)-th level signal input, a first low level input, a second low level input, and a signal output. The n-th level array substrate row driving unit further includes a pull-up driving unit, a pull-up unit, a first pull-down unit, and a second pull-down unit. The three-level-driven array substrate row driving circuit contributes to reduce the manufacturing cost of the liquid crystal panel and the narrow border design. By adopting the three-level-driven method, the impact caused by the feed-through voltage, which is generated by the data line and the gate line, toward the TFT LCD is effectively eliminated such that the display performance is enhanced.

14 Claims, 5 Drawing Sheets

THREE-LEVEL-DRIVEN ARRAY SUBSTRATE ROW DRIVING CIRCUIT

BACKGROUND OF THE INVENTION

1. Field of the Invention

The present disclosure relates to liquid crystal display technology, and more particularly to a three-level-driven array substrate row driving circuit.

2. Discussion of the Related Art

Liquid crystal displays (LCDs) typically are characterized by attributes including thin, power-saving, and low radiation. These are reasons that LCDs are greatly adopted. With the evolution of the LCDs, corresponding solutions in regards to a variety of demands, such as high resolution rate, high brightness, wide viewing angle, low power consumption, and so on, are developed. Currently, most of the LCDs are backlight-type LCD, which includes a liquid crystal panel and a backlight module. The operating principle relates to arranging liquid crystal molecules between two parallel glass substrates, and applying a driving voltage to the two glass substrates by a driving circuit so as to control the alignment of the liquid crystal molecules. In this way, the light beams from the backlight module are reflected out to generate images.

With respect to the two-level-driven principle for driving circuits, despite of a variety of feed-through voltages, the most important one is the feed-through voltage generated by the parasitic capacitor ($C_{gd}$), which is generated by the gate line and the data line. Thus, the voltage of the common electrode has to be adjusted so as to improve the gray level performance when adopting the two-level driven method. However, as liquid crystal capacitor ($C_{lc}$) is not a fixed parameter, it is not easy to enhance the image performance by adjusting the voltage of the common electrode, which results in a three-level driving method. The feed-through voltage can be compensated without changing the voltage of the common electrode. The operating principle of the three-level driving method utilizes the feed-through voltage generated by the storage capacitor ($C_{st}$) to compensate the feed-through voltage generated by the parasitic capacitor ($C_{gd}$). This is the reason that the three-level driving method can only be adopted by the panel with the structure "$C_s$ on gate". That is, one electrode of the storage capacitor ($C_s$) shares the potential with the gate line.

FIG. 1 is a waveform diagram of the gate driver voltage adopting a conventional three-level driving method. It can be understood that the driving waveforms of the gate driver include three different voltages. When the lines of the gate driver is closed, the voltage is pulled to be the lowest voltage until the lines of the next gate driver is also closed. Afterward, the voltage is pulled back as indicated by "A" in FIG. 1. The pulled-back voltage is for compensating the feed-through voltage of the lines of the next gate driver. That is, when the lines of each of the gate driver is closed, the feed-through voltage generated by the parasitic capacitor ($C_{gd}$) is compensated by the feed-through voltage generated by the storage capacitor ($C_s$) when the voltage of the lines of the previous gate driver is pulled back.

The feed-through voltage ($V_{gd}$) generated by the parasitic capacitor ($C_{gd}$) satisfies the following equation:

$$V_{gd}=(V_{g\_high}-V_{g\_low})*C_{gd}/(C_{gd}+C_{lc}+C_s);$$

wherein $V_{g\_high}$ and $V_{g\_low}$ respectively indicates the turn-on voltage and the turn-off voltage of the lines of the gate driver.

The feed-through voltage ($V_{cs}$) generated by the storage capacitor ($C_s$) satisfies the following equation:

$$V_{cs}=(V_{p2}-V_{p1})*C_s/(C_{gd}+C_{lc}+C_s);$$

Wherein $V_{p1}$ and $V_{p2}$ respectively indicates the voltages before and after the lines of the previous gate driver is pulled back.

If the feed-through voltage ($V_{gd}$) and the feed-through voltage ($V_{cs}$) have to be offset, the feed-through voltage generated by the parasitic capacitor ($C_{gd}$) has to be the same with the feed-through voltage generated by the storage capacitor ($C_s$). Thus, the voltage needed to be pulled back ($V_e$) satisfies the equation: $V_e=V_{p2}-V_{p1}=(V_{g\_high}-V_{g\_low})*C_{gd}/C_s$. It can be understood that $V_{g\_high}-V_{g\_low}=V_g+V_e$ in view of FIG. 1. Thus, the voltage needed to be pulled back ($V_e$)=($V_g+V_e$)*$C_{gd}/C_s$. That is, $V_e=V_g*C_{gd}/(C_s-C_{gd})$.

In view of the above, it can be understood that though the feed-through voltage may be affected by the liquid crystal capacitor ($C_{lc}$). However, the impact of the liquid crystal capacitor ($C_{lc}$) would disappear while adopting three-level driving method. Thus, when the panel manufacturing and the turn-on voltage of the gate driver are determined, the voltage needed to be pulled back ($V_e$) can be precisely calculated.

Recently, as the demand toward high-density and low-cost LCDs, one important technical solution is Gate Driver On Array (GOA). The GOA integrates the gate switch circuit on the array substrate of the liquid crystal panel by utilizing the array substrate row driving technology so as to omit the gate driving integrated circuit, which reduce both the material cost and the manufacturing process. Such technical solution is also called as array substrate row driving circuit. The array substrate row driving circuit includes a plurality of array substrate row driving units, and each of the array substrate row driving unit corresponds to one gate line. Specifically, each array substrate row driving unit of the array substrate row driving circuit connects to one gate line. In addition, the output of the array substrate row driving unit connects to the input of the next array substrate row driving unit. FIG. 2 is a circuit diagram of a conventional two-level 4T1C array substrate row driving circuit, which specifically includes four thin film transistors (TFTs) (Q100, Q200, Q300, Q400), and one capacitor (Cb). The gate of the TFT (Q100) electrically connects to one end of the capacitor (Cb), the drain of the TFT (Q400), and the source of the TFT (Q300) respectively. The drain electrically connects to the other end of the capacitor (Cb) and the source of the TFT (Q200). The source of the TFT (Q200) electrically connects to the other end of the capacitor (Cb) and the drain of the TFT (Q100) respectively, and the gate of the TFT (Q200) electrically connects to the gate of the TFT (Q300). The source of the TFT (Q300) electrically connects to the gate of the TFT (Q100), one end of the capacitor (Cb), and the drain of the TFT (Q400) respectively. The TFT (Q100) is a driving transistor for controlling the high level output of the gate line. The TFT (Q200) and the TFT (Q300) are resetting TFTs for pulling down the potential of the gate line, and the charges of the capacitor (Cb) are released at the same time such that the TFT (Q100) is turned off. The TFT (Q400) is the output controlling transistor for charging the capacitor (Cb) so as to turn on the TFT (Q100). The main function of the capacitor (Cb) is to store the charges to keep the potential of the TFT (Q100). FIG. 3 is a driving timing diagram of the two-level 4T1C array substrate row driving circuit of FIG. 2. STV relates to an activating pulse signal. The input signal is the output signals of the gate line arranged in the last row (gate[n−1]). The output signal of the TFT (Q100) is represented by "gate [n]," and the resetting signal is represented by "gate[n+1]", which relates to the output signals of the gate line arranged in the next row. The input of the TFT (Q100) is the clock signals.

In order to reduce the manufacturing cost of the liquid crystal panel and to achieve the narrow border design, the array substrate row driving technology has been adopted on high-end products. However, the array substrate row driving technology are mainly applied to two-level driving solution.

SUMMARY

The object of the claimed invention is to provide a three-level-driven array substrate row driving circuit for reducing the manufacturing cost of the liquid crystal panel and for achieving the narrow border design. At the same time, the array substrate row driving solution is also applied to the three-level-driven method. As such, the impact caused by the feed-through voltage, which is generated by the data line and the gate line, toward the TFT LCD is effectively eliminated such that the display performance is enhanced.

In one aspect, a three-level-driven array substrate row driving circuit includes cascaded multi-level array substrate row driving units. Each of the array substrate row driving units includes: a pull-up driving unit having a first input and a first output; a pull-up unit having a second input, a third input and a second output, the second output electrically connects to the first output; a first pull-down unit having a third output, a fourth output, a fourth input and a fifth input, the third output electrically connects to the first output and the second input respectively, and the fourth output and the second output are electrically connected; and a second pull-down unit having a fifth output, a sixth input and a seventh input, the fifth output electrically connects to the second output and the fourth output respectively.

Wherein the n-th level array substrate row driving unit further includes a clock signal input, a (n−1)-th level signal input, a (n+1)-th level signal input, a (n+3)-th level signal input, a first low level input, a second low level input, and a signal output, wherein the clock signal input electrically connects to the third input of the pull-up unit, the (n−1)-th level signal input electrically connects to the first input of the pull-up driving unit, the (n+1)-th level signal input electrically connects to the fourth input of the first pull-down unit, the (n+3)-th level signal input electrically connects to the sixth input of the second pull-down unit, the first low level input electrically connects to the fifth input of the first pull-down unit, the second low level input electrically connects to the seventh input of the second pull-down unit, the signal outputs electrically connects to the second output of the pull-up unit, the fourth output of the first pull-down unit, and the fifth output of the second pull-down unit respectively; the first low level input is for inputting a first low level, the second low level input is for inputting a second low level, the first low level is smaller than the second low level; when n is in the range from 2 to fourth from the bottom, the (n−1)-th level signal input of the n-th level array substrate row driving unit electrically connects to the signal output of the (n−1)-th level array substrate row driving unit. The (n+1)-th level signal input of the n-th level array substrate row driving unit electrically connects to the signal output of the (n+1)-th level array substrate row driving unit. The (n+3)-th level signal input of the n-th level array substrate row driving unit electrically connects to the signal output of the (n+3)-th level array substrate row driving unit; when n equals to one, the (n−1)-th level signal input of the n-th level array substrate row driving unit is for inputting an activating pulse signal, the (n+1)-th level signal input of the n-th level array substrate row driving unit electrically connects to the signal output of the (n+1)-th level array substrate row driving unit, the (n+3)-th level signal input signal input of the n-th level array substrate row driving unit electrically connects to the signal output of the (n+3)-th level array substrate row driving unit; when the n-th level array substrate row driving unit is any one of the penultimate or the antepenultimate array substrate row driving unit, the (n−1)-th level signal input of the n-th level array substrate row driving unit electrically connects to the signal output of the (n−1)-th level array substrate row driving unit, the (n+1)-th level signal input of the n-th level array substrate row driving unit electrically connects to the signal output of the (n+1)-th level array substrate row driving unit, the (n+3)-th level signal input of the n-th level array substrate row driving unit is configured to be dangling; and when the n-th level array substrate row driving unit is the last array substrate row driving unit, the (n−1)-th level signal input of the n-th level array substrate row driving unit electrically connects to the signal output of the (n−1)-th level array substrate row driving unit, and the (n+1)-th level signal input of the n-th level array substrate row driving unit and the (n+3)-th level signal input are configured to be dangling.

Wherein the pull-up driving unit further includes a first switch having a first pin, a second pin, and a third pin, the first pin and the second pin are electrically connected to form a first input, and the third pin forms the first output.

Wherein the pull-up unit further includes a second switch and a storage capacitor, the second switch includes a forth pin, a fifth pin, and a sixth pin, the fourth pin electrically connects to one end of the storage capacitor to form the second input, the fifth pin forms the third input, and the sixth pin electrically connects to the other end of the storage capacitor to form the second output.

Wherein the first pull-down unit includes a third switch and a fourth switch, the third switch includes a seventh pin, an eighth pin, and a ninth pin, the fourth switch includes a tenth pin, an eleventh pin, and a twelfth pin, the eighth pin forms the third output, the seventh pin and the tenth pin are electrically connected to form the fourth input, the eleventh pin forms the fourth output, the ninth pin and the twelfth pin are electrically connected to form the fifth input.

Wherein the second pull-down unit further includes a fifth switch having a thirteenth pin, a fourteenth pin, and a fifteenth pin, the thirteenth pin forms the sixth input, the fourteenth pin forms the fifth output, and the fifteenth pin forms the seventh input.

Wherein the first switch is a first thin film transistor (TFT), the first TFT includes a first gate, a first source, and a first drain, the first pin is the first gate, the second pin is the first source, and the third pin is the first drain.

Wherein the second switch is a second TFT, the second TFT includes a second gate, a second source, and a second drain, the fourth pin is the second gate, the fifth pin is the second source, and the sixth pin is the second drain.

Wherein the third switch is a third TFT, the third TFT includes a third gate, a third source, and a third drain, the seventh pin is the third gate, the eighth pin is the third source, and the ninth pin is the third drain, the fourth switch is a fourth TFT, the fourth TFT includes a fourth gate, a fourth source, and a fourth drain, the tenth pin is the fourth gate, the eleventh pin is the fourth source, and the twelfth pin is the fourth drain.

Wherein the fifth switch is a fifth TFT, the fifth TFT includes a fifth gate, a fifth source, and a fifth drain, the thirteenth pin is the fifth gate, the fourteenth pin is the fifth source, and the fifteenth pin is the fifth drain.

In another aspect, a three-level-driven array substrate row driving circuit includes cascaded multi-level array substrate row driving units. Each of the array substrate row driving unit includes: a pull-up driving unit having a first input and a first output; a pull-up unit having a second input, a third input and a second output, the second output electrically connects to the first output; a first pull-down unit having a third output, a fourth output, a fourth input and a fifth input, the third output electrically connects to the first output and the second input respectively, and the fourth output and the second output are electrically connected; a second pull-down unit having a fifth output, a sixth input and a seventh input, the fifth output electrically connects to the second output and the fourth output respectively; wherein the n-th level array substrate row driving unit further includes a clock signal input, a (n−1)-th level signal input, a (n+1)-th level signal input, a (n+3)-th level signal input, a first low level input, a second low level input, and a signal output, wherein the clock signal input electrically connects to the third input of the pull-up unit, the (n−1)-th level signal input electrically connects to the first input of the pull-up driving unit, the (n+1)-th level signal input electrically connects to the fourth input of the first pull-down unit, the (n+3)-th level signal input electrically connects to the sixth input of the second pull-down unit, the first low level input electrically connects to the fifth input of the first pull-down unit, the second low level input electrically connects to the seventh input of the second pull-down unit, the signal outputs electrically connects to the second output of the pull-up unit, the fourth output of the first pull-down unit, and the fifth output of the second pull-down unit respectively; the first low level input is for inputting a first low level, the second low level input is for inputting a second low level, the first low level is smaller than the second low level; when n is in the range from 2 to fourth from the bottom, the (n−1)-th level signal input of the n-th level array substrate row driving unit electrically connects to the signal output of the (n−1)-th level array substrate row driving unit. The (n+1)-th level signal input of the n-th level array substrate row driving unit electrically connects to the signal output of the (n+1)-th level array substrate row driving unit. The (n+3)-th level signal input of the n-th level array substrate row driving unit electrically connects to the signal output of the (n+3)-th level array substrate row driving unit; when n equals to one, the (n−1)-th level signal input of the n-th level array substrate row driving unit is for inputting an activating pulse signal, the (n+1)-th level signal input of the n-th level array substrate row driving unit electrically connects to the signal output of the (n+1)-th level array substrate row driving unit, the (n+3)-th level signal input signal input of the n-th level array substrate row driving unit electrically connects to the signal output of the (n+3)-th level array substrate row driving unit; when the n-th level array substrate row driving unit is any one of the penultimate or the antepenultimate array substrate row driving unit, the (n−1)-th level signal input of the n-th level array substrate row driving unit electrically connects to the signal output of the (n−1)-th level array substrate row driving unit, the (n+1)-th level signal input of the n-th level array substrate row driving unit electrically connects to the signal output of the (n+1)-th level array substrate row driving unit, the (n+3)-th level signal input of the n-th level array substrate row driving unit is configured to be dangling; when the n-th level array substrate row driving unit is the last array substrate row driving unit, the (n−1)-th level signal input of the n-th level array substrate row driving unit electrically connects to the signal output of the (n−1)-th level array substrate row driving unit, and the (n+1)-th level signal input of the n-th level array substrate row driving unit and the (n+3)-th level signal input are configured to be dangling; wherein the pull-up driving unit further includes a first switch having a first pin, a second pin, and a third pin, the first pin and the second pin are electrically connected to form a first input, and the third pin forms the first output; wherein the pull-up unit further includes a second switch and a storage capacitor, the second switch includes a forth pin, a fifth pin, and a sixth pin, the fourth pin electrically connects to one end of the storage capacitor to form the second input, the fifth pin forms the third input, and the sixth pin electrically connects to the other end of the storage capacitor to form the second output; wherein the first pull-down unit includes a third switch and a fourth switch, the third switch includes a seventh pin, an eighth pin, and a ninth pin, the fourth switch includes a tenth pin, an eleventh pin, and a twelfth pin, the eighth pin forms the third output, the seventh pin and the tenth pin are electrically connected to form the fourth input, the eleventh pin forms the fourth output, the ninth pin and the twelfth pin are electrically connected to form the fifth input; and wherein the second pull-down unit further includes a fifth switch having a thirteenth pin, a fourteenth pin, and a fifteenth pin, the thirteenth pin forms the sixth input, the fourteenth pin forms the fifth output, and the fifteenth pin forms the seventh input.

Wherein the first switch is a first TFT, the first TFT includes a first gate, a first source, and a first drain, the first pin is the first gate, the second pin is the first source, and the third pin is the first drain.

Wherein the second switch is a second TFT, the second TFT includes a second gate, a second source, and a second drain, the fourth pin is the second gate, the fifth pin is the second source, and the sixth pin is the second drain.

Wherein the third switch is a third TFT, the third TFT includes a third gate, a third source, and a third drain, the seventh pin is the third gate, the eighth pin is the third source, and the ninth pin is the third drain, the fourth switch is a fourth TFT, the fourth TFT includes a fourth gate, a fourth source, and a fourth drain, the tenth pin is the fourth gate, the eleventh pin is the fourth source, and the twelfth pin is the fourth drain.

Wherein the fifth switch is a fifth TFT, the fifth TFT includes a fifth gate, a fifth source, and a fifth drain, the thirteenth pin is the fifth gate, the fourteenth pin is the fifth source, and the fifteenth pin is the fifth drain.

In view of the above, the gate switch circuit is integrated on the array substrate of the liquid crystal panel by the array substrate row driving solution, which contributes to reduce the manufacturing cost of the liquid crystal panel and the narrow border design. At the same time, the array substrate row driving solution is also applied to the three-level-driven method. By resetting the signal output to the first low level via the first pull-down unit and by resetting the signal output to the second low level via the second pull-down unit, the impact caused by the feed-through voltage, which is generated by the data line and the gate line, toward the TFT LCD is effectively eliminated such that the display performance is enhanced.

In order to further understand the characteristics of the invention as well as technical content, see the following detailed description of the present invention and the accompanying drawings, drawings, however, for reference purposes only and description of use is not intended to limit the present invention.

BRIEF DESCRIPTION OF THE DRAWINGS

Below in conjunction with the accompanying drawings, through a specific embodiment of the present invention is described in detail, and will make apparent the technical solution of the present invention, and other beneficial effects.

DETAILED DESCRIPTION OF THE EMBODIMENTS

Embodiments of the invention will now be described more fully hereinafter with reference to the accompanying drawings, in which embodiments of the invention are shown.

Figure 1:
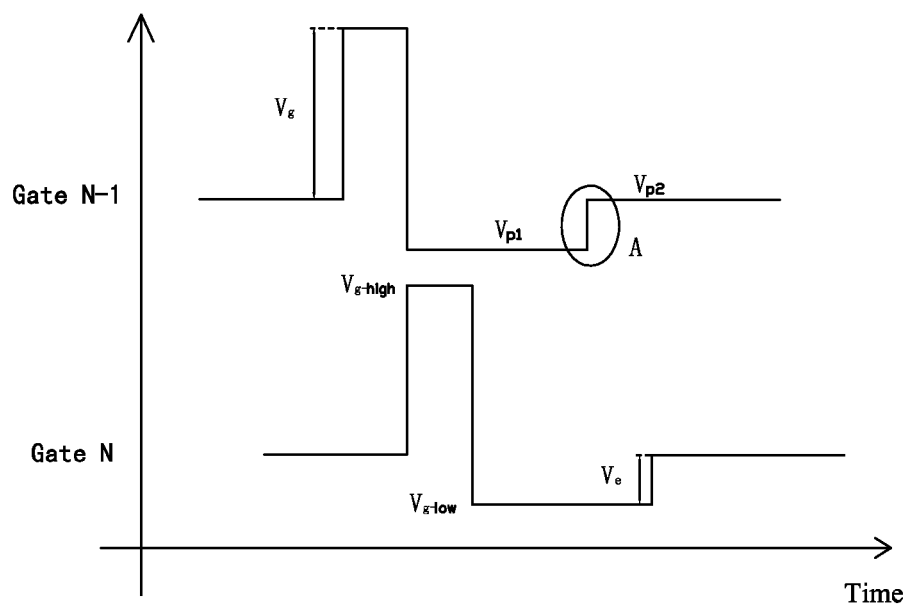
FIG. 1 is a waveform diagram of the gate driver voltage adopting a conventional three-level driving method.
Figure 2:
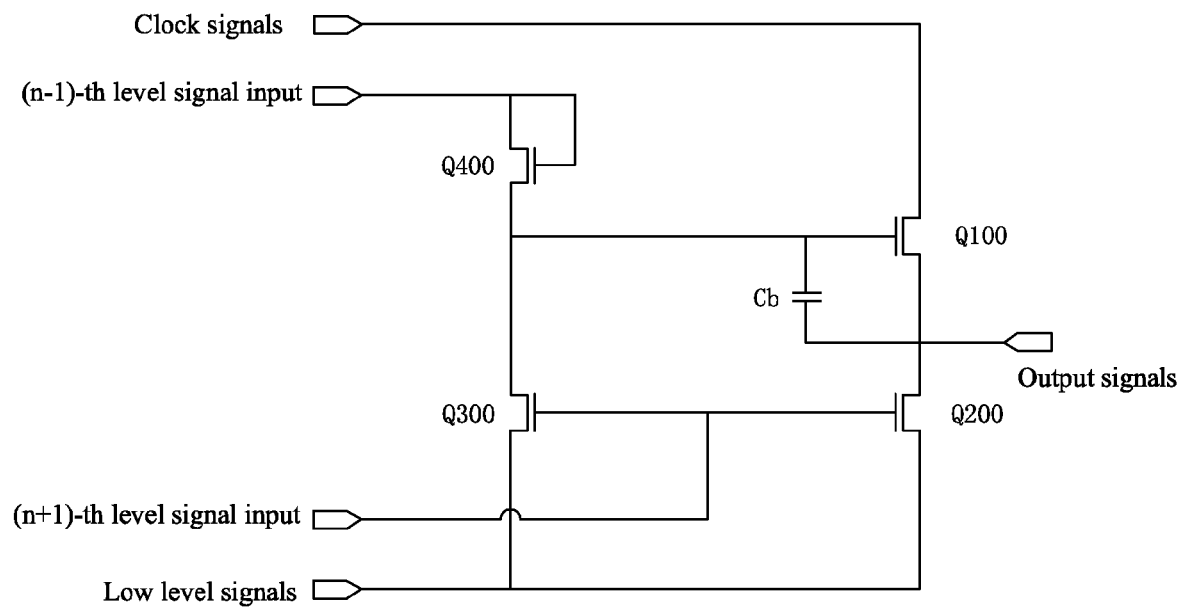
FIG. 2 is a circuit diagram of a conventional two-level 4T1C array substrate row driving circuit.
Figure 3:
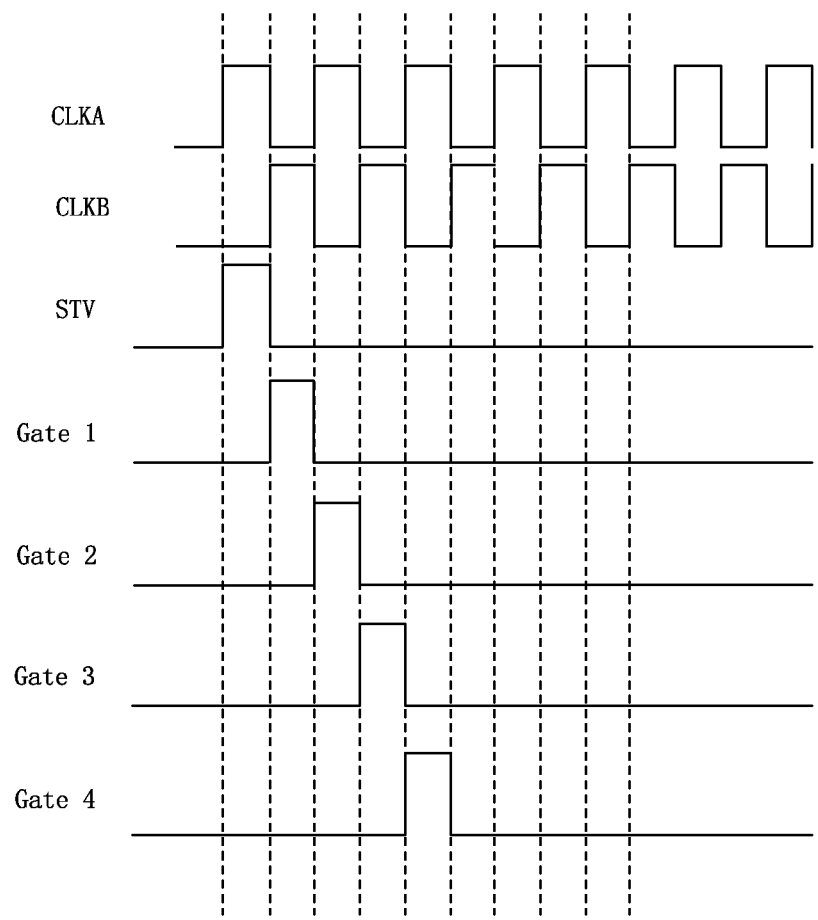
FIG. 3 is a driving timing diagram of the two-level 4T1C array substrate row driving circuit of FIG. 2.
Figure 4:
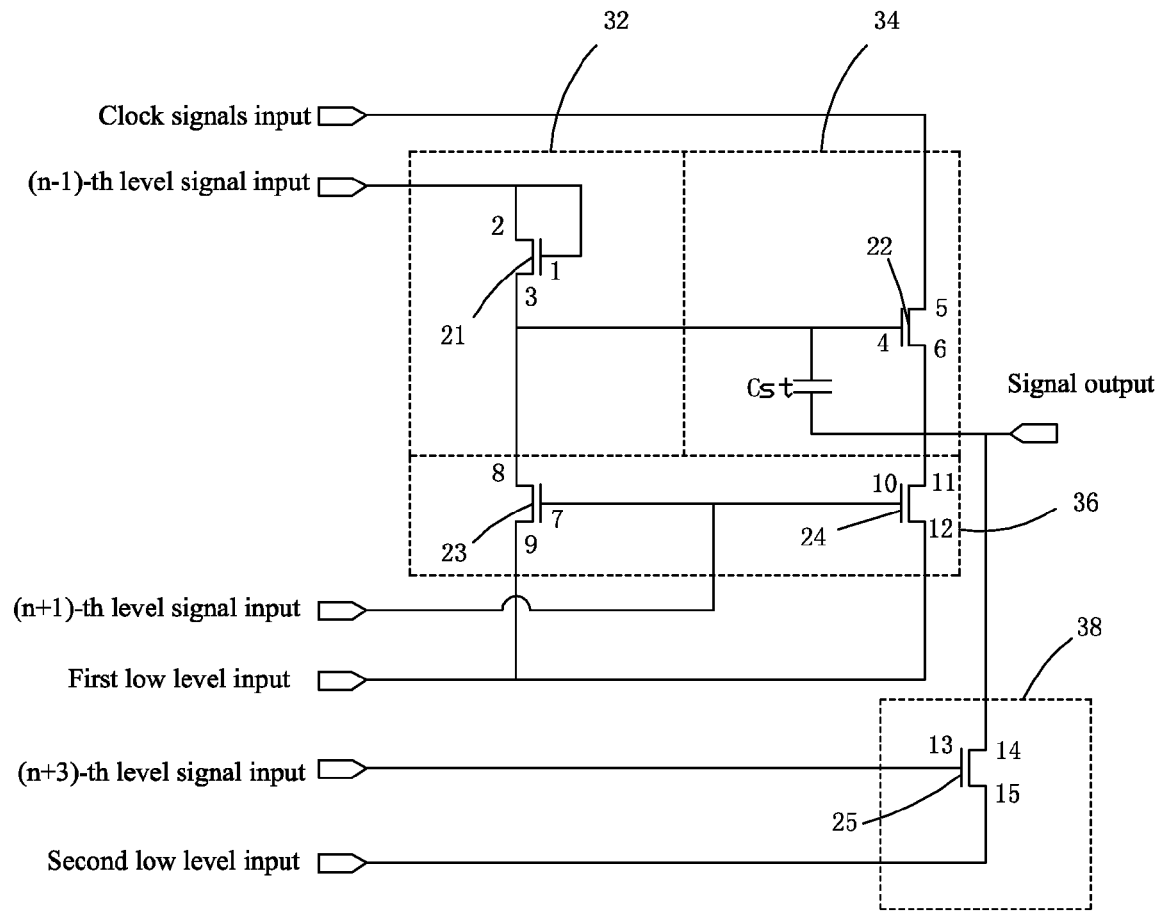
FIG. 4 is a circuit diagram of the three-level-driven array substrate row driving circuit in accordance with one embodiment.

FIG. 4 is a circuit diagram of the three-level-driven array substrate row driving circuit in accordance with one embodiment. The three-level-driven array substrate row driving circuit includes cascaded multi-level array substrate row driving units. The cascaded multi-level array substrate row driving units have substantially the same structure.

Each of the array substrate row driving unit includes a pull-up driving unit 32 having a first input and a first output, a pull-up unit 34 having a second input electrically connecting to the first output, a third input and a second output, a first pull-down unit 36, and a second pull-down unit 38. The first pull-down unit 36 includes a third output, a fourth output, a fourth input and a fifth input. The third output electrically connects to the first output and the second input respectively. The fourth output and the second output are electrically connects. The second pull-down unit 38 includes a fifth output, a sixth input and a seventh input. The fifth output electrically connects to the second output and the fourth output respectively.

The n-th level array substrate row driving unit of the multi-level array substrate row driving units further includes a clock signal input, a (n−1)-th level signal input, a (n+1)-th level signal input, a (n+3)-th level signal input, a first low level input, a second low level input, and a signal output. The clock signal input electrically connects to the third input of the pull-up unit 34. The (n−1)-th level signal input electrically connects to the first input of the pull-up driving unit 32. The (n+1)-th level signal input electrically connects to the fourth input of the first pull-down unit 36. The (n+3)-th level signal input electrically connects to the sixth input of the second pull-down unit 38. The first low level input electrically connects to the fifth input of the first pull-down unit 36. The second low level input electrically connects to the seventh input of the second pull-down unit 38. The signal outputs electrically connects to the second output of the pull-up unit 34, the fourth output of the first pull-down unit 36, and the fifth output of the second pull-down unit 38 respectively.

The first low level input is for inputting a first low level ($V_{ss1}$). The second low level input is for inputting a second low level ($V_{ss2}$). The first low level ($V_{ss1}$) is smaller than the second low level ($V_{ss2}$).

When n is in the range from 2 to fourth from the bottom, the (n−1)-th level signal input of the n-th level array substrate row driving unit electrically connects to the signal output of the (n−1)-th level array substrate row driving unit. The (n+1)-th level signal input of the n-th level array substrate row driving unit electrically connects to the signal output of the (n+1)-th level array substrate row driving unit. The (n+3)-th level signal input of the n-th level array substrate row driving unit electrically connects to the signal output of the (n+3)-th level array substrate row driving unit.

When n equals to one, the (n−1)-th level signal input of the n-th level array substrate row driving unit is for inputting an activating pulse signal (STV) provided by a timing controller (TCON) (not shown). The (n+1)-th level signal input of the n-th level array substrate row driving unit electrically connects to the signal output of the (n+1)-th level array substrate row driving unit. The (n+3)-th level signal input signal input of the n-th level array substrate row driving unit electrically connects to the signal output of the (n+3)-th level array substrate row driving unit.

When the n-th level array substrate row driving unit is any one of the penultimate or the antepenultimate array substrate row driving unit, the (n−1)-th level signal input of the n-th level array substrate row driving unit electrically connects to the signal output of the (n−1)-th level array substrate row driving unit. The (n+1)-th level signal input of the n-th level array substrate row driving unit electrically connects to the signal output of the (n+1)-th level array substrate row driving unit. The (n+3)-th level signal input of the n-th level array substrate row driving unit is configured to be dangling.

When the n-th level array substrate row driving unit is the last array substrate row driving unit, the (n−1)-th level signal input of the n-th level array substrate row driving unit electrically connects to the signal output of the (n−1)-th level array substrate row driving unit. The (n+1)-th level signal input of the n-th level array substrate row driving unit and the (n+3)-th level signal input are configured to be dangling. Furthermore, the pull-up driving unit 32 further includes a first switch 21 having a first pin 1, a second pin 2, and a third pin 3. The first pin 1 and the second pin 2 are electrically connected to form a first input. The third pin 3 forms the first output. In other words, the first pin 1 and the second pin 2 are electrically connected with the (n−1)-th level signal input, and the third pin 3 electrically connects to the first pull-down unit 36 and the pull-up unit 34 respectively.

The pull-up unit 34 further includes a second switch 22 and the storage capacitor ($C_{st}$). The second switch 22 includes a fourth pin 4, a fifth pin 5, and a sixth pin 6. The fourth pin 4 electrically connects to one end of the storage capacitor ($C_{st}$) to form the second input. The fifth pin 5 forms the third input. The sixth pin 6 electrically connects to the other end of the storage capacitor ($C_{st}$) to form the second output. In other words, the fourth pin 4 electrically connects to the third pin 3, the first pull-down unit 36 and one end of the storage capacitor ($C_{st}$) respectively. The fifth pin 5 and the clock signal input are electrically connected. The sixth pin electrically connects to the other end of the storage capacitor ($C_{st}$), the first pull-down unit 36, the second pull-down unit 38, and the signal output respectively.

The first pull-down unit 36 further includes a third switch 23 and a fourth switch 24. The third switch 23 includes a seventh pin 7, an eighth pin 8, and a ninth pin 9. The fourth switch 24 includes a tenth pin 10, an eleventh pin 11, and a twelfth pin 12. The eighth pin 8 forms the third output. The seventh pin 7 and the tenth pin 10 are electrically connected to form the fourth input. The eleventh pin 11 forms the fourth output. The ninth pin 9 and the twelfth pin 12 are electrically connected to form the fifth input. In other words, the seventh pin 7 electrically connects to the tenth pin 10 and the (n+1)-th level signal input respectively. The eighth pin 8 electrically connects to the third pin 3, the fourth pin 4, and one end of the storage capacitor ($C_{st}$) respectively. The ninth pin 9 electrically connects to the first low level input and the twelfth pin 12 respectively. The tenth pin 10 electrically connects to the (n+1)-th level signal input and the seventh pin 7 respectively. The eleventh pin 11 electrically connects to the sixth pin 6, the other end of the storage capacitor ($C_{st}$), the signal output, and the second pull-down unit 38 respectively. The twelfth pin 12 electrically connects to the first low level input and the ninth pin 9 respectively.

The second pull-down unit 38 further includes a fifth switch 25 having a thirteenth pin 13, a fourteenth pin 14, and a fifteenth pin 15. The thirteenth pin 13 forms the sixth input. The fourteenth pin 14 forms the fifth output, and the fifteenth pin 15 forms the seventh input. In other words, the thirteenth pin 13 electrically connects to the (n+3)-th level signal input. The fourteenth pin 14 electrically connects to the other end of the storage capacitor ($C_{st}$), the sixth pin 6, the eleventh pin 11, and the signal output respectively. The fifteenth pin 15 and the second low level input are electrically connected.

In the embodiment, the first to fifth switch 21, 22, 23, 24, and 25 are respectively a first to fifth thin film transistor (TFT). The corresponding pins are described hereinafter. The first TFT includes a first gate, a first source, and a first drain. The first pin 1 is the first gate. The second pin 2 is the first source. The third pin 3 is the first drain. The second TFT includes a second gate, a second source, and a second drain. The fourth pin 4 is the second gate, the fifth pin 5 is the second source, and the sixth pin 6 is the second drain. The third TFT includes a third gate, a third source, and a third drain. The seventh pin 7 is the third gate, the eighth pin 8 is the third source, and the ninth pin 9 is the third drain. The fourth switch is a fourth TFT. The fourth TFT includes a fourth gate, a fourth source, and a fourth drain. The tenth pin 10 is the fourth gate, the eleventh pin 11 is the fourth source, and the twelfth pin 12 is the fourth drain. The fifth TFT includes a fifth gate, a fifth source, and a fifth drain. The thirteenth pin 13 is the fifth gate, the fourteenth pin 14 is the fifth source, and the fifteenth pin 15 is the fifth drain.

Figure 5:
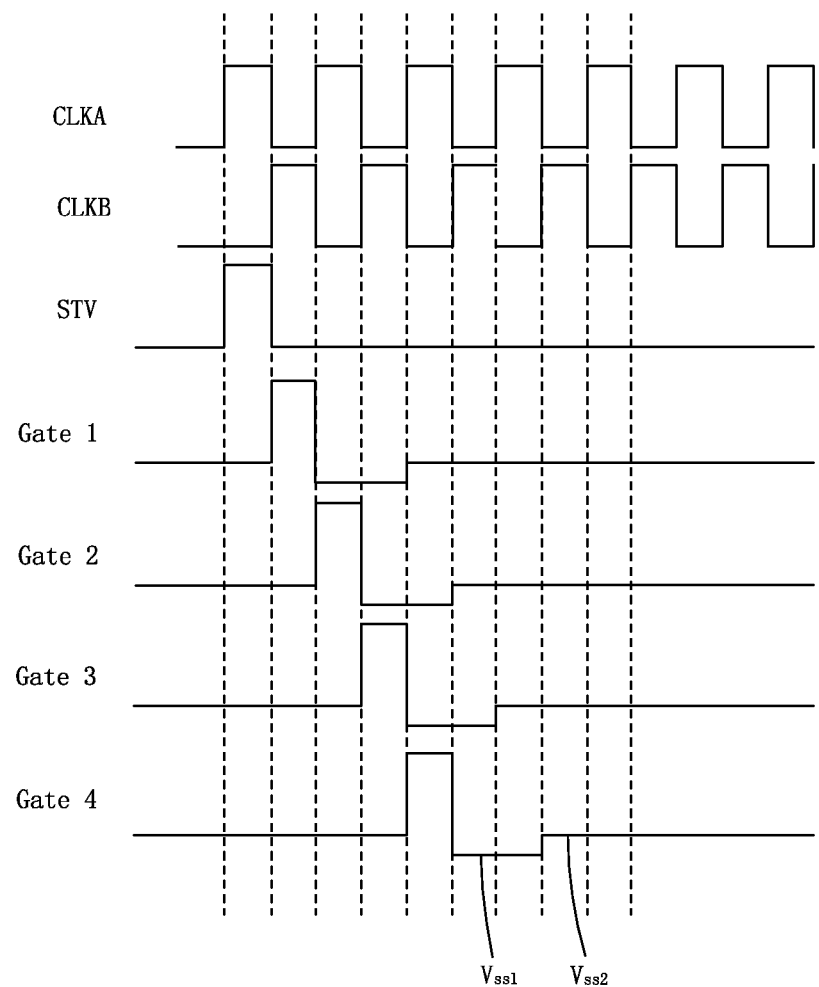
FIG. 5 is a driving timing diagram of the three-level-driven array substrate row driving circuit of FIG. 4.

Referring to FIG. 5, CLKA and CLKB represents two clock signals at high and low potential, and the two clock signals are inversed during the same time period. One of the clock signals is the signals inputted from the clock signal input. STV represents one activating pulse signal provided by the timing controller (TCON). When the n-th level array substrate row driving unit is the first-level array substrate row driving unit, the activating pulse signal (STV) is inputted to the (n−1)-th level signal input of the n-th level array substrate row driving unit. The operating principle of the n-th level array substrate row driving unit of the array substrate row driving circuit will be described hereinafter. When the signal inputted from the (n−1)-th level signal input is at high level, the first switch 21 is turned on, and the storage capacitor ($C_{st}$) is charged so as to turn on the second switch 22. The clock signals inputted from the clock signal input is transmitted to the signal output and then is outputted. At this moment, the signals inputted to the (n+1)-th level signal input and the (n+3)-th level signal input are at low level. The third switch 23, the fourth switch 24, and the fifth switch 25 are in an open state. When the signals inputted to the (n−1)-th level signal input is at low level, the first switch 21 is in the open state. When the signals inputted to the (n+1)-th level signal input transited to the high level, the signals inputted to the (n+3)-th level signal input is at low level, and the third switch 23 and the fourth switch 24 are turned on. The fifth switch 25 is in the open state and an output level of the signal output is arranged at the first low level ($V_{ss1}$), and the storage capacitor ($C_{st}$) is discharged. Afterward, the signals inputted to the (n+1)-th level signal input transit to the high level. The signals inputted to the (n+3)-th level signal input is at high level. The third switch 23 and the fourth switch 24 are in the open state, and the fifth switch 25 is turned on. The output level of the signals output is arranged at the second low level ($V_{ss2}$). The second low level ($V_{ss2}$) is larger than the first low level ($V_{ss1}$). In this way, the array substrate row driving circuit is driven by three levels. Afterward, the signals inputted to the (n+3)-th level signal input also transit to the low level, and the fifth switch 25 is in the open state.

In view of the above, the gate switch circuit is integrated on the array substrate of the liquid crystal panel by the array substrate row driving solution, which contributes to reduce the manufacturing cost of the liquid crystal panel and the narrow border design. At the same time, the array substrate row driving solution is also applied to the three-level-driven method. By resetting the signal output to the first low level via the first pull-down unit and by resetting the signal output to the second low level via the second pull-down unit, the impact caused by the feed-through voltage, which is generated by the data line and the gate line, toward the TFT LCD is effectively eliminated such that the display performance is enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A three-level-driven array substrate row driving circuit having cascaded multi-level array substrate row driving units, each of the array substrate row driving units comprising:
  a pull-up driving unit having a first input and a first output;
  a pull-up unit having a second input, a third input and a second output, the second output electrically connects to the first output;
  a first pull-down unit having a third output, a fourth output, a fourth input and a fifth input, the third output electrically connects to the first output and the second input respectively, and the fourth output and the second output are electrically connected; and
  a second pull-down unit having a fifth output, a sixth input and a seventh input, the fifth output electrically connects to the second output and the fourth output respectively;
  wherein the n-th level array substrate row driving unit further comprises a clock signal input, a (n−1)-th level signal input, a (n+1)-th level signal input, a (n+3)-th level signal input, first low level input, a second low level input, and a signal output, wherein the clock signal input electrically connects to the third input of the pull-up unit, the (n−1)-th level signal input electrically connects to the first input of the pull-up driving unit, the (n+1)-th level signal input electrically connects to the fourth input of the first pull-down unit, the (n+3)-th level signal input electrically connects to the sixth input of the second pull-down unit, the first low level input electrically connects to the fifth input of the first pull-down unit, the second low level input electrically connects to the seventh input of the second pull-down unit, the signal outputs electrically connects to the second output of the pull-up unit, the fourth output of the first pull-down unit, and the fifth output of the second pull-down unit respectively;
  the first low level input is for inputting a first low level, the second low level input is for inputting a second low level, the first low level is smaller than the second low level;
  when n is in the range from 2 to fourth from the bottom, the (n−1)-th level signal input of the n-th level array substrate row driving unit electrically connects to the signal output of the (n−1)-th level array substrate row driving unit. The (n+1)-th level signal input of the n-th level array substrate row driving unit electrically connects to the signal output of the (n+1)-th level substrate row driving unit. The (n+3)-th level signal input of the n-th level array substrate row driving unit electrically connects to the signal output of the (n+3)-th level array substrate row driving unit;

when n equals to one, the (n−1)-th level signal input of the n-th level array substrate row driving unit is for inputting an activating pulse signal, the (n+1)-th level signal input of the n-th level array substrate row driving unit electrically connects to the signal output of the (n+1)-th level array substrate row driving unit, the (n+3)-th level signal input signal input of the n-th level array substrate row driving unit electrically connects to the signal output of the (n+3)-th level array substrate row driving unit;

when the n-th level array substrate row driving unit is any one of the penultimate or the antepenultimate array substrate row driving unit, the (n−1)-th level signal input of the n-th level array substrate row driving unit electrically connects to the signal output of the (n−1)-th level array substrate row driving unit, the (n+1)-th level signal input of the n-th level array substrate row driving unit electrically connects to the signal output of the (n+1)-th level array substrate row driving unit, the (n+3)-th level signal input of the n-th level array substrate row driving unit is configured to be dangling; and when the n-th level array substrate row driving unit is the last array substrate row driving unit the (n−1)-th level signal input of the n-th level array substrate row driving unit electrically connects to the signal output of the (n−1)-th level array substrate row driving unit, and the (n+1)-th level signal input of the n-th level array substrate row driving unit and the (n+3)-th level signal input are configured to be dangling.

2. The three-level-driven array substrate row driving circuit as claimed in claim 1, wherein the pull-up driving unit further includes a first switch having a first pin, a second pin, and a third pin, the first pin and the second pin are electrically connected to form a first input, and the third pin forms the first output.

3. The three-level-driven array substrate row driving circuit as claimed in claim 1, wherein the pull-up unit further comprises a second switch and a storage capacitor, the second switch comprises a forth pin, a fifth pin, and a sixth pin, the fourth pin electrically connects to one end of the storage capacitor to form the second input, the fifth pin forms the third input, and the sixth pin electrically connects to the other end of the storage capacitor to form the second output.

4. The three-level-driven array substrate row driving circuit as claimed in claim 1, wherein the first pull-down unit comprises a third switch and a fourth switch, the third switch includes a seventh pin, an eighth pin, and a ninth pin, the fourth switch comprises a tenth pin, an eleventh pin, and a twelfth pin, the eighth pin forms the third output, the seventh pin and the tenth pin are electrically connected to form the fourth input, the eleventh pin forms the fourth output, the ninth pin and the twelfth pin are electrically connected to form the fifth input.

5. The three-level-driven array substrate row driving circuit as claimed in claim 1, wherein the second pull-down unit further comprises a fifth switch having a thirteenth pin, a fourteenth pin, and a fifteenth pin, the thirteenth pin forms the sixth input, the fourteenth pin forms the fifth output, and the fifteenth pin forms the seventh input.

6. The three-level-driven array substrate row driving circuit as claimed in claim 2, wherein the first switch is a first thin film transistor (TFT), the first TFT comprises a first gate, a first source, and a first drain, the first pin is the first gate, the second pin is the first source, and the third pin is the first drain.

7. The three-level-driven array substrate row driving circuit as claimed in claim 3, wherein the second switch is a second TFT, the second TFT comprises a second gate, a second source, and a second drain, the fourth pin is the second gate, the fifth pin is the second source, and the sixth pin is the second drain.

8. The three-level-driven array substrate row driving circuit as claimed in claim 4, wherein the third switch is a third TFT, the third TFT comprises a third gate, a third source, and a third drain, the seventh pin is the third gate, the eighth pin is the third source, and the ninth pin is the third drain, the fourth switch is a fourth TFT, the fourth TFT comprises a fourth gate, a fourth source, and a fourth drain, the tenth pin is the fourth gate, the eleventh pin is the fourth source, and the twelfth pin is the fourth drain.

9. The three-level-driven array substrate row driving circuit as claimed in claim 5, wherein the fifth switch is a fifth TFT, the fifth TFT comprises a fifth gate, a fifth source, and a fifth drain, the thirteenth pin is the fifth gate, the fourteenth pin is the fifth source, and the fifteenth pin is the fifth drain.

10. A three-level-driven array substrate row driving circuit having cascaded multi-level array substrate row driving units, each of the array substrate row driving unit comprising:
   a pull-up driving unit having a first input and a first output;
   a pull-up unit having a second input, a third input and a second output, the second output electrically connects to the first output;
   a first pull-down unit having a third output, a fourth output, a fourth input and a fifth input, the third output electrically connects to the first output and the second input respectively, and the fourth output and the second output are electrically connected;
   a second pull-down unit having a fifth output, a sixth input and a seventh input, the fifth output electrically connects to the second output and the fourth output respectively;
   wherein the n-th level array substrate row driving unit further comprises a clock signal input, a (n−1)-th level signal input, a (n+1)-th level signal input, a (n+3)-th level signal input, a first low level input, a second low level input, and a signal output, wherein the clock signal input electrically connects to the third input of the pull-up unit, the (n−1)-th level signal input electrically connects to the first input of the pull-up driving unit, the (n+1)-th level signal input electrically connects to the fourth input of the first pull-down unit, the (n+3)-th level signal input electrically connects to the sixth input of the second pull-down unit, the first low level input electrically connects to the fifth input of the first pull-down unit, the second low level input electrically connects to the seventh input of the second pull-down unit, the signal outputs electrically connects to the second output of the pull-up unit, the fourth output of the first pull-down unit, and the fifth output of the second pull-down unit respectively;
   the first low level input is for inputting a first low level, the second low level input is for inputting a second low level, the first low level is smaller than the second low level;
   when n is in the range from 2 to fourth from the bottom, the (n−1)-th level signal input of the n-th level array substrate row driving unit electrically connects to the signal output of the (n−1)-th level array substrate row driving unit. The (n+1)-th level signal input of the n-th level array substrate row driving unit electrically connects to the signal output of the (n+1)-th level array substrate row driving unit. The (n+3)-th level signal input of the n-th level array substrate row driving unit electrically connects to the signal output of the (n+3)-th level array substrate row driving unit;

when n equals to one, the (n−1)-th level signal input of the n-th level array substrate row driving unit is for inputting an activating pulse signal, the (n+1)-th level signal input of the n-th level array substrate row driving unit electrically connects to the signal output of the (n+1)-th level array substrate row driving unit, the (n+3)-th level signal input signal input of the n-th level array substrate row driving unit electrically connects to the signal output of the (n+3)-th level array substrate row driving unit;

when the n-th level array substrate row driving unit is any one of the penultimate or the antepenultimate array substrate row driving unit, the (n−1)-th level signal input of the n-th level array substrate row driving unit electrically connects to the signal output of the (n−1)-th level array substrate row driving unit, the (n+1)-th level signal input of the n-th level array substrate row driving unit electrically connects to the signal output of the (n+1)-th level array substrate row driving unit, the (n+3)-th level signal input of the n-th level array substrate row driving unit is configured to be dangling;

when the n-th level array substrate row driving unit is the last array substrate row driving unit, the (n−1)-th level signal input of the n-th level array substrate row driving unit electrically connects to the signal output of the (n−1)-th level array substrate row driving unit, and the (n+1)-th level signal input of the n-th level array substrate row driving unit and the (n+3)-th level signal input are configured to be dangling;

wherein the pull-up driving unit further comprises a first switch having a first pin, a second pin, and a third pin, the first pin and the second pin are electrically connected to form a first input, and the third pin forms the first output;

wherein the pull-up unit further comprises a second switch and a storage capacitor, the second switch comprises a forth pin, a fifth pin, and a sixth pin, the fourth pin electrically connects to one end of the storage capacitor to form the second input, the fifth pin forms the third input, and the sixth pin electrically connects to the other end of the storage capacitor to form the second output;

wherein the first pull-down unit comprises a third switch and a fourth switch, the third switch includes a seventh pin, an eighth pin, and a ninth pin, the fourth switch comprises a tenth pin, an eleventh pin, and a twelfth pin, the eighth pin forms the third output, the seventh pin and the tenth pin are electrically connected to form the fourth input, the eleventh pin forms the fourth output, the ninth pin and the twelfth pin are electrically connected to form the fifth input; and wherein the second pull-down unit further comprises a fifth switch having a thirteenth pin, a fourteenth pin, and a fifteenth pin, the thirteenth pin forms the sixth input, the fourteenth pin forms the fifth output, and the fifteenth pin forms the seventh input.

11. The three-level-driven array substrate row driving circuit as claimed in claim 10, wherein the first switch is a first TFT, the first TFT comprises a first gate, a first source, and a first drain, the first pin is the first gate, the second pin is the first source, and the third pin is the first drain.

12. The three-level-driven array substrate row driving circuit as claimed in claim 10, wherein the second switch is a second TFT, the second TFT comprises a second gate, a second source, and a second drain, the fourth pin is the second gate, the fifth pin is the second source, and the sixth pin is the second drain.

13. The three-level-driven array substrate row driving circuit as claimed in claim 10, wherein the third switch is a third TFT, the third TFT comprises a third gate, a third source, and a third drain, the seventh pin is the third gate, the eighth pin is the third source, and the ninth pin is the third drain, the fourth switch is a fourth TFT, the fourth TFT comprises a fourth gate, a fourth source, and a fourth drain, the tenth pin is the fourth gate, the eleventh pin is the fourth source, and the twelfth pin is the fourth drain.

14. The three-level-driven array substrate row driving circuit as claimed in claim 10, wherein the fifth switch is a fifth TFT, the fifth TFT comprises a fifth gate, a fifth source, and a fifth drain, the thirteenth pin is the fifth gate, the fourteenth pin is the fifth source, and the fifteenth pin is the fifth drain.

* * * * *